United States Patent [19]

Overton et al.

[11] Patent Number: 4,956,443
[45] Date of Patent: Sep. 11, 1990

[54] POLYESTER FROM HYDROXYETHOXYPHENOXY ACETIC ACID WITH IMPROVE GAS BARRIER PROPERTIES

[75] Inventors: James R. Overton, Kingsport; Steven L. Stafford, Gray; Charles E. Sumner, Jr., Kingsport, all of Tenn.

[73] Assignee: Eastman Kodak Company, Rochester, N.Y.

[21] Appl. No.: 358,229

[22] Filed: May 30, 1989

[51] Int. Cl.$^5$ .............................................. C08G 63/06
[52] U.S. Cl. ................................................... 528/206
[58] Field of Search ......................................... 528/206

[56] References Cited

U.S. PATENT DOCUMENTS

| | | | |
|---|---|---|---|
| 4,110,315 | 8/1978 | Go | 528/294 |
| 4,307,060 | 12/1981 | Go | 528/173 |
| 4,426,512 | 1/1984 | Barbee et al. | 528/173 |
| 4,440,922 | 4/1984 | Barbee et al. | 528/194 |
| 4,482,695 | 11/1984 | Barbee et al. | 528/208 |
| 4,501,879 | 2/1985 | Barbee et al. | 528/288 |
| 4,552,948 | 11/1985 | Barbee et al. | 528/194 |
| 4,560,741 | 12/1985 | Davis et al. | 528/302 |
| 4,574,148 | 3/1986 | Wicker et al. | 528/173 |
| 4,663,426 | 5/1987 | Wicker et al. | 528/190 |

*Primary Examiner*—Harold D. Anderson
*Attorney, Agent, or Firm*—Charles R. Martin; William P. Heath, Jr.

[57] ABSTRACT

Polyester resins useful for forming containers having improved resistance to gas permeability comprised of recurring units corresponding to the structure

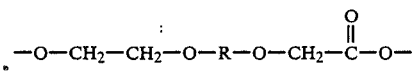

wherein R is selected from the group consisting of

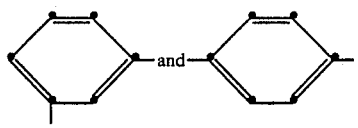

4 Claims, No Drawings

POLYESTER FROM HYDROXYETHOXYPHENOXY ACETIC ACID WITH IMPROVE GAS BARRIER PROPERTIES

The invention relates to polyester resins useful for forming packages which have improved gas barrier properties.

Presently there is a strong interest in the packaging industry for protecting consumable products such as foodstuffs, medicines, and especially carbonated beverages by enveloping the substances in packages which are formed from various polymers. While molded containers formed from known polyesters have many desirable characteristics, there is a need in the art to provide improved polyester containers which will have lower gas permeabilities. Such improved containers would be much more versatile in their utilization and allow the containers to be used to package substances for which containers of known polyesters may not be suitable.

In accordance with the present invention, it has been found that a particular polyester exhibits enhanced gas barrier properties. The polyester can be described as comprised of recurring units corresponding to the structure $$-O-CH_2-CH_2-O-R-O-CH_2-\overset{O}{\underset{\|}{C}}-O-$$

wherein R is selected from the group consisting of

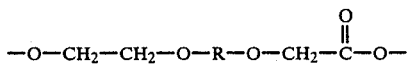

The polyesters of this invention are prepared by condensing the compound corresponding to the structure $$HO-CH_2-CH_2-O-R-O-CH_2-\overset{O}{\underset{\|}{C}}-OH$$

wherein R is selected from the group consisting of

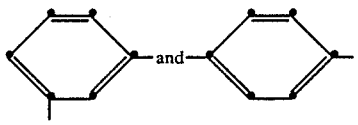

preferably R is

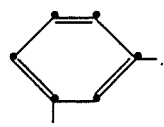

Where R is

the compound can be called m-(2-hydroxyethoxy) phenoxyacetic acid and where R is

the compound can be called p-(2-hydroxyethoxy) phenoxyacetic acid.

The polyesters of the present invention exhibit an I.V. of at least 0.5, preferably at least 1.0 measured at 25° C. in a 60/40 by weight mixture of phenol/tetrachloroethane at a concentration of 0.5 g/100 mL.

The polyesters of the present invention are prepared by methods well known in the art. Temperatures which are suitable for forming the polyesters generally range between about 180° C. and about 295° C., with the preferred range being about 200° C. to 285° C. The reaction may be conducted under an inert atmosphere, such as nitrogen. Preferably, the latter stage of the reaction is conducted under a vacuum. Conventional catalysts are typically used.

Optionable additives, such as dyes, pigments, plasticizers, fillers, antioxidants and stabilizers may be employed in conventional amounts. Such additives may be added directly to the reaction or may be added to the final polymer.

The polyester are formed into containers using conventional plastic processing techniques such as compression molding and blow molding. Preferably, the molded containers are biaxially oriented blow-molded containers. Strong, flexible and clear sheets, films and other like structures can be formed by well known extrusion techniques. These may be formed into wrappers, bags and the like.

The polyesters may also be used to form a laminating layer between two or more permeable layers of film. In like manner, a layer of the polyester of the present invention may be coextruded as a pipe or similar structure between two or more compatible, permeable layers. The polyesters may also be used for dip coating containers from a polymer solution in order to improve the barrier properties of a package. In each of these embodiments, the present invention offers the additional advantage of not requiring the use of a tie layer.

Containers made from the polyesters are ideally suited for protecting consumable products, such as foodstuffs, soft drinks, and medicines. These containers have desirable low oxygen and carbon dioxide permeability. Because of the decreased gas transmission rates of these polyesters, they perform well in packaging applications where improved gas barrier properties are required. Typically, the containers of the present invention exhibit an oxygen permeability of less than about 3.0, preferably, less than about 2.5, and a carbon dioxide permeability of less than about 15, preferably, less than about 13, measured as cubic centimeters permeating a 1 mil thick sample, 100 inches square, for a 24-hour period under a partial pressure difference of 1 atmosphere at 30° C.

EXAMPLE

This example illustrates the preparation of the polyester of this invention as well as the desirable low gas permeability of this polyester.

The polymer is prepared by polymerization of 25 grams (0.1179 moles) of m-(2-hydroxyethoxy)phenoxyacetic acid in the presence of 50 parts per million of titanium from titanium tetraisopropoxide. The monomer is purged three times with nitrogen and started heating at 200° C. with stirring under nitrogen. The temperature is increased to 250° C. over a ten minute period. The nitrogen is removed and reduced pressure of about 0.45 millimetres of mercury is applied for one hour. A viscous polymer is formed which is cooled, isolated, and ground to a small particle size. The polymer has an inherent viscosity of about 0.79 and a glass transition of about 48° C. The polymer is crystallized by heating about 72 hours at 85° C. and has a crystalline melting point of about 133° C.

The oxygen permeability of the polyester is measured to be 0.50 cc ·mil/100 in.$^2$·24 hr·atm as determined in cubic centimeters permeating a 2.9 mil thick sample, 10 inches square, for a 24 hour period under an oxygen partial pressure difference of one atmosphere at 30° C. using a MOCON Oxtran 100 instrument. The polyester is extruded into amorphous film using a Brabender extruder at 250° C.-290° C. The film used to measure permeability is 3 mils-8 mils in thickness. The carbon dioxide permeability of the polyester is measured to be 1.05 as determined by using a MOCON permatran C instrument.

I claim:

1. A polyester having an inherent viscosity of at least 0.5 measured at 25 degrees C. in a 60/40 by weight mixture of phenol/tetrachloroethane at a concentration of 0.5 g/100 mL comprised of recurring units corresponding to the structure

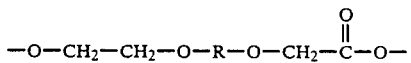

wherein R is selected from the group consisting of

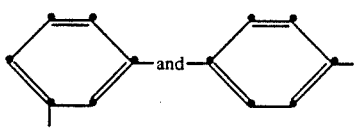

2. The polyester of claim 1 wherein

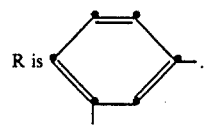

3. A container formed from the polyester of claim 1.
4. A film formed from the polyester of claim 1.

* * * * *